US012573973B2

(12) United States Patent
Yin

(10) Patent No.: US 12,573,973 B2
(45) Date of Patent: Mar. 10, 2026

(54) SALIENCY TRACKING FOR BRUSHLESS DC MOTORS AND OTHER PERMANENT MAGNET SYNCHRONOUS MOTORS

(71) Applicant: Kai Yin, Phoenix, AZ (US)

(72) Inventor: Kai Yin, Phoenix, AZ (US)

( * ) Notice: Subject to any disclaimer, the term of this patent is extended or adjusted under 35 U.S.C. 154(b) by 662 days.

(21) Appl. No.: 17/947,916

(22) Filed: Sep. 19, 2022

(65) Prior Publication Data

US 2023/0104742 A1 Apr. 6, 2023

Related U.S. Application Data

(60) Provisional application No. 63/245,545, filed on Sep. 17, 2021.

(51) Int. Cl.
| | |
|---|---|
| *H02P 1/46* | (2006.01) |
| *H02P 6/08* | (2016.01) |
| *H02P 6/28* | (2016.01) |
| *H02P 21/18* | (2016.01) |
| *H02P 25/03* | (2016.01) |
| *H02P 27/08* | (2006.01) |
| *H02K 21/16* | (2006.01) |

(52) U.S. Cl.
CPC ................ H02P 21/18 (2016.02); H02P 6/08 (2013.01); H02P 6/28 (2016.02); H02P 25/03 (2016.02); H02P 27/08 (2013.01); *H02K 21/16* (2013.01)

(58) Field of Classification Search
CPC .... H02P 21/18; H02P 6/28; H02P 6/08; H02P 27/08; H02P 25/03
USPC ......................................................... 318/700
See application file for complete search history.

(56) References Cited

U.S. PATENT DOCUMENTS

| | | | | |
|---|---|---|---|---|
| 10,784,805 | B1 * | 9/2020 | Bojoi ...................... | H02P 21/22 |
| 10,797,629 | B2 * | 10/2020 | Lakshmi Narasimha | ................... H02P 6/183 |
| 2008/0197799 | A1 * | 8/2008 | Tomigashi .............. | H02P 21/22 318/811 |
| 2020/0389110 | A1 * | 12/2020 | Yajurvedi ............... | H02P 6/183 |
| 2021/0075354 | A1 * | 3/2021 | Sun ......................... | H02P 27/12 |
| 2021/0359626 | A1 * | 11/2021 | Im ........................... | H02P 21/18 |

* cited by examiner

*Primary Examiner* — Erick D Glass
(74) *Attorney, Agent, or Firm* — Bryan L. Baysinger; Thomas R. Parker, II; Maynard Nexsen PC

(57) ABSTRACT

Saliency tracking for brushless direct current (BLDC) motors and other permanent magnet synchronous motors (PMSMs) is provided. Embodiments generate an accurate estimate of rotor position for use in field-oriented control (FOC) of BLDC motors. In addition, a robust saliency tracking algorithm provides for the use of BLDC motors in low-speed high-torque applications without the need of external sensors. This enables sensorless application of higher level algorithms as well, such as servo control. In addition, accurate measurement of motor phase inductance and flux linkage can be provided without any additional equipment.

22 Claims, 9 Drawing Sheets

900
Inject a pulsating voltage into a PMSM

902
Measure a current responsive to the pulsating voltage

904
Estimate the rotor position of the PMSM from the measured current

906
Estimate a speed of the PMSM from the estimated position

908
Measure motor phase inductance from the measured current

910
Measure motor phase flux linkage from the estimated speed and voltage

SALIENCY TRACKING FOR BRUSHLESS DC MOTORS AND OTHER PERMANENT MAGNET SYNCHRONOUS MOTORS

CROSS-REFERENCES TO RELATED APPLICATIONS

This application claims the benefit of U.S. Provisional Patent Application No. 63/245,545, filed Sep. 17, 2021, and incorporates the disclosure of the application by reference.

BACKGROUND OF THE TECHNOLOGY

Brushless direct current (BLDC) motors are seeing widespread use in a variety of applications including but not limited to micromobility, such as electric bicycles and robotics for actuation. Unlike their brushed counterparts, BLDC motors require electrical commutation; that is, their internal magnetic field must be caried by an alternating current rather than by a mechanical commutator. To accurately commutate BLDC motors, the position must be obtained with reasonable accuracy.

A popular control scheme for BLDC motors is field-oriented control (FOC) for permanent magnet synchronous motors (PMSMs). FOC aims to deliver sinusoidal currents to the motor to achieve the highest possible efficiency. FOC requires a relatively accurate position estimate to function properly. There are many ways to obtain the position of a BLDC motor with and without sensors. The most common method is by estimating the back-electromotive force (BEMF) of the motor, that is, measuring the voltage generated by the rotation of the magnets.

These methods are robust and well developed; however, they require rotation to provide position information, and do not work at a standstill and perform poorly at low speeds. This is quite problematic for the applications mentioned previously, as devices such as electric bicycles need to be able to provide torque and start from a standstill. The present workaround to this weakness of BEMF is to employ the use of external sensors that can report rotor position regardless of speed. Some sensor types include quadrature encoders and hall effect sensors. Unfortunately, sensors come with their own set of disadvantages and complications. They incur additional costs (e.g., from the sensors themselves, assembly costs, and additional wire harnesses) and are an added point of failure.

SUMMARY OF THE TECHNOLOGY

Saliency tracking for brushless direct current (BLDC) motors and other permanent magnet synchronous motors (PMSMs) is provided. Embodiments generate an accurate estimate of rotor position for use in field-oriented control (FOC) of BLDC motors. In addition, a robust saliency tracking algorithm provides for the use of BLDC motors in low-speed high-torque applications without the need of external sensors. This enables sensorless application of higher level algorithms as well, such as servo control.

Currently, fields such as micromobility and robotics use either expensive or cheap but unreliable sensors to address the issue of low-speed startup and braking. Embodiments described herein allow for the elimination of these sensors and thus save cost and improve system performance. In addition, accurate measurement of motor phase inductance and flux linkage can be provided without any additional equipment.

An exemplary embodiment provides a method for estimating rotor position of a PMSM. The method includes injecting a pulsating voltage into the PMSM; measuring a current responsive to the pulsating voltage; and estimating the rotor position of the PMSM from the measured current.

Another exemplary embodiment provides a rotor position estimator for a PMSM. The rotor position estimator includes a pulsating voltage generator configured to inject a pulsating voltage into the PMSM; an envelope detector configured to measure a current responsive to the injected pulsating voltage; and a phase-locked loop (PLL) configured to estimate a rotor position of the PMSM from an output of the envelope detector.

Another exemplary embodiment provides an electric motor control system. The electric motor control system includes an inverter configured to apply a torque-producing current to operate an electric motor; a current detector configured to measure current through the electric motor; and a processor coupled to the inverter and the current detector, wherein the processor is configured to implement a saliency tracking observer. The saliency tracking observer causes the inverter to inject a pulsating voltage into the electric motor; receives a current responsive to the pulsating voltage from the current detector; and estimates a rotor position of the electric motor from the measured current.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

A more complete understanding of the present technology may be derived by referring to the detailed description and claims when considered in connection with the following illustrative figures. In the following figures, like reference numbers refer to similar elements and steps throughout the figures.

Figure 1:
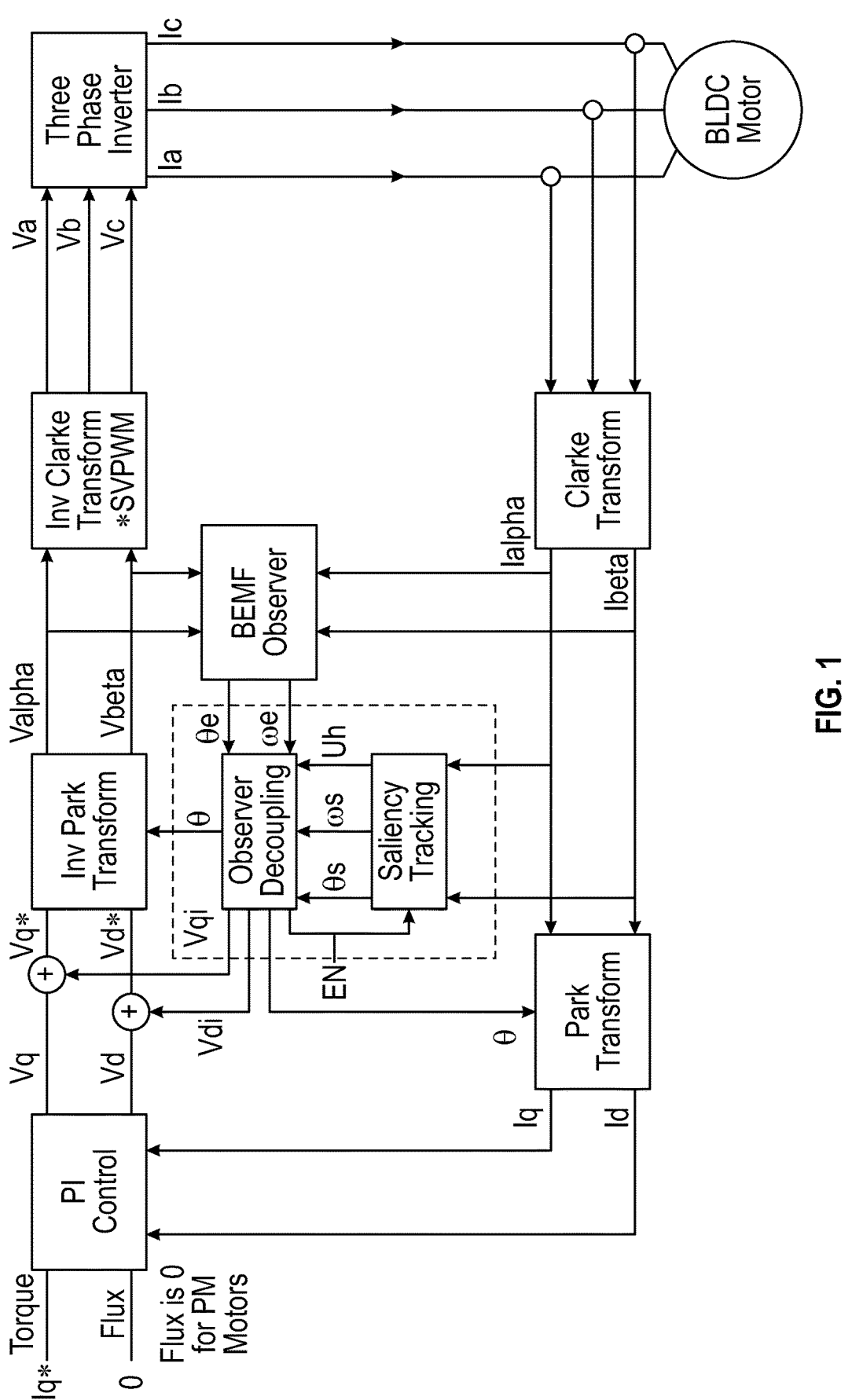
FIG. 1 representatively illustrates a schematic block diagram of an exemplary field-oriented control (FOC) system for a brushless direct current (BLDC) motor or other permanent magnet synchronous motor (PMSM) which includes an improved saliency tracking algorithm according to embodiments described herein.

Elements and steps in the figures are illustrated for simplicity and clarity and have not necessarily been rendered according to any particular sequence. For example, steps that may be performed concurrently or in a different order are illustrated in the figures to help to improve understanding of embodiments of the present technology.

DETAILED DESCRIPTION OF EXEMPLARY EMBODIMENTS

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Saliency tracking for brushless direct current (BLDC) motors and other permanent magnet synchronous motors (PMSMs) is provided. Embodiments generate an accurate estimate of rotor position for use in field-oriented control (FOC) of BLDC motors. In addition, a robust saliency tracking algorithm provides for the use of BLDC motors in low-speed high-torque applications without the need of external sensors. This enables sensorless application of higher level algorithms as well, such as servo control.

Currently, fields such as micromobility and robotics use either expensive or cheap but unreliable sensors to address the issue of low-speed startup and braking. Embodiments described herein allow for the elimination of these sensors and thus save cost and improve system performance. In addition, accurate measurement of motor phase inductance and flux linkage can be provided without any additional equipment.

I. Introduction

Saliency tracking is a method for estimating a motor's stator inductance between each phase of the motor to obtain position information. This inductance information is used to obtain rotor position and speed. Saliency tracking works by exploiting motor saliency. Motor saliency is the phenomenon that each motor winding has a different inductance, and this inductance varies as the motor rotates. This inductance information can be exploited to estimate speed and position.

The most common form of saliency tracking is high frequency pulsating voltage injection. When BLDC motors and PMSMs are modeled as synchronous machines (direct and quadrature axis), saliency causes the direct axis inductance to be lower than the quadrature axis inductance. The controller estimates the location of these axes. By injecting a pulsating voltage in the estimated direct axis, the differential inductance of the real axes causes an error current to arise in the estimated quadrature axis. The controller can correct this error to zero and track rotor position. Since saliency is a physical property of the motor and does not depend on operating characteristics, saliency tracking can provide rotor position at standstill and low speeds. One side effect of the pulsating voltages and currents is the generation of acoustic noise at the injection frequency.

Saliency tracking is a well-developed method for very large industrial PMSM drives and automotive scale electric vehicles; however, existing methods are not robust enough to be practical in most BLDC motors. Limitations include the low inductance of many BLDC motors used in micromobility and robotics applications and that the saliency signal is rather weak. The reason for this is large PMSMs used in industrial and automotive applications are specifically constructed to maximize saliency.

Saliency arises from two effects: reluctance of the rotor and saturation of the stator. PMSMs used for industrial and automotive applications have their permanent magnets buried in the rotor and surrounded by electrical steel. This creates a reluctance effect in which the rotor inductance couples into the stator, creating saliency. Saturation saliency arises from saturation of the stator from the permanent magnet flux coupling into the stator. Reluctance saliency is very robust and easy to detect. Saturation saliency is often weak and difficult to detect. As BLDC motors are built to minimize size, they do not incorporate rotor iron, and have relatively weak and nonconstant saturation saliency, thus presenting the challenge of implementing saliency tracking for such motors. Existing algorithms are not stable with BLDC motors and have other issues, such as unacceptable amounts of acoustic noise, poor tracking, and inverted polarity. Embodiments described herein address these limitations by providing a practical method of saliency tracking for BLDC motors of nearly all sizes, and by extension, PMSMs of any size. This disclosure addresses the following issues:

Resolving magnet polarity;

Elimination of acoustic noise;

Decoupling saliency tracking from traditional back-electromotive force (BEMF) observers; and Amplifying and robustly tracking the saliency of a BLDC motor.

The improved saliency tracking approach described herein offers the following advantages compared to other saliency tracking algorithms:

Ability to track position on traditionally non-salient motors;

Ability to accurately measure motor phase inductance and flux linkage with accuracy limited only by the quantization error of the three-phase inverter voltage outputs;

No sensors needed;

Stability with a wide range of BLDC motors that have weak and variable saliency;

Expanded application scope with PMSMs of any type;

Seamless integration with a variety of BEMF observers;

Elimination of acoustic noise;

Compact and efficient implementation;

Requires less than 10 kilobytes (kB) of code space and 4 kB of random-access memory (RAM) on embedded systems when written in C;

Relatively simple and easy to implement state machines and state transitions;

Requires fewer than 600 clock cycles on a 32-bit floating point processor;

Simple and straightforward voltage injection scheme; and

Hardware compatible with any system already supporting sensorless BEMF FOC.

An exemplary embodiment includes the following components:

Saliency Tracking Block;

Observer Decoupling Block; and

Signal Amplification Block.

II. Improved Saliency Tracking—Overview

The improved saliency tracking algorithm of embodiments described herein is a sensorless position estimation algorithm for use with BLDC motors and PMSMs at standstill and low speed. This saliency tracking algorithm can be integrated with FOC. It is meant to be implemented as a firmware or software module in an embedded system that controls the speed and/or position of a BLDC motor or PMSM. Embodiments provide an accurate estimate of the rotor position of a motor so that a FOC algorithm can effectively control the speed and/or position of a BLDC motor.

The improved saliency tracking algorithm can be used in place of (i.e., eliminate) external sensors or can be used as a backup method in case of sensor failure. This approach works by injecting a pulsating voltage into the motor and measuring the resulting currents from the motor. Using the measured currents and digital signal processing, the algorithm then obtains an accurate position estimate of the rotor position. Embodiments use hardware with ability to measure motor phase currents reliably. When combined with an appropriate state machine, embodiments are also able to accurately measure motor phase inductance and flux linkage.

A. FOC with Improved Saliency Tracking

FIG. 1 is a schematic block diagram of an exemplary FOC system for a BLDC or other PMSM which includes an improved saliency tracking algorithm according to embodiments described herein. The embodiments are outlined by the dotted box. The FOC system incorporates other blocks, including a three phase inverter for driving the motor, current feedback and voltage feedback, PI controllers for regulating flux and torque producing currents, a BEMF observer that tracks position at high speed using BEMF information from the motor. The FOC system further includes a Park transform, Clarke transform, and their corresponding inverses for translating feedback signals into a rotating synchronous frame of reference. Also included are voltage injection taps that may or may not be used, depending on application, but are used extensively by embodiments described herein.

B. Saliency Tracking Observer

Figure 2:
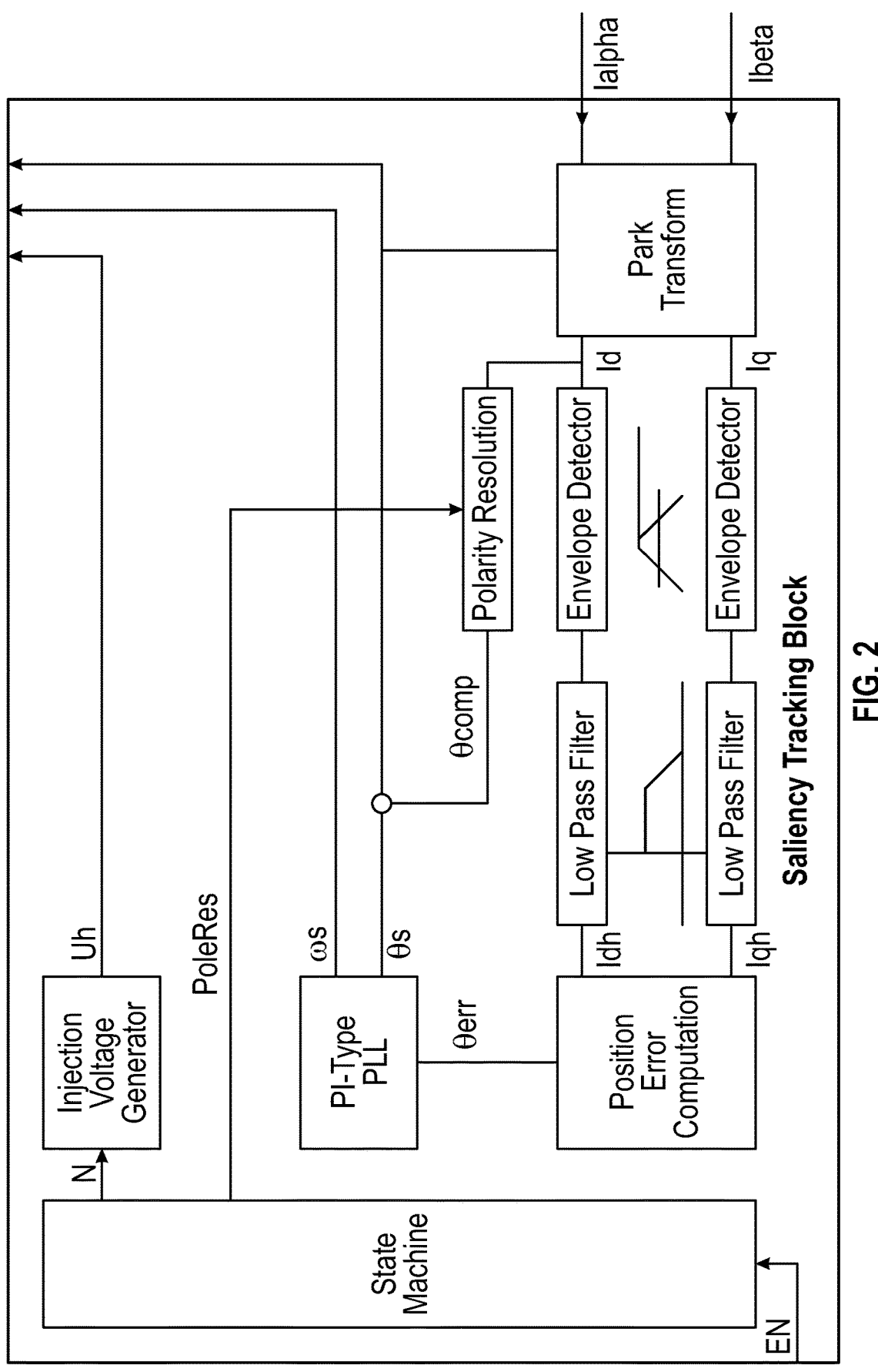
FIG. 2 representatively illustrates a schematic block diagram of an exemplary saliency tracking observer such as illustrated in FIG. 1.

FIG. 2 is a schematic block diagram of an exemplary saliency tracking observer such as illustrated in FIG. 1. The saliency tracking observer includes the following components:

Hybrid frequency pulsating voltage generator;

Envelope detector and low-pass filters;

Error Calculation and PI-type Phase locked loop for position and speed estimation; and Polarity resolution block.

The saliency tracking observer injects a pulsating voltage into the direct axis of the estimated synchronous frame in FOC and derives a position and speed estimation of the motor by exploiting the differential quadrature and direct axes inductances. These components are described in more detail in Sections II.B.1-II.B.4 below.

Figure 3:
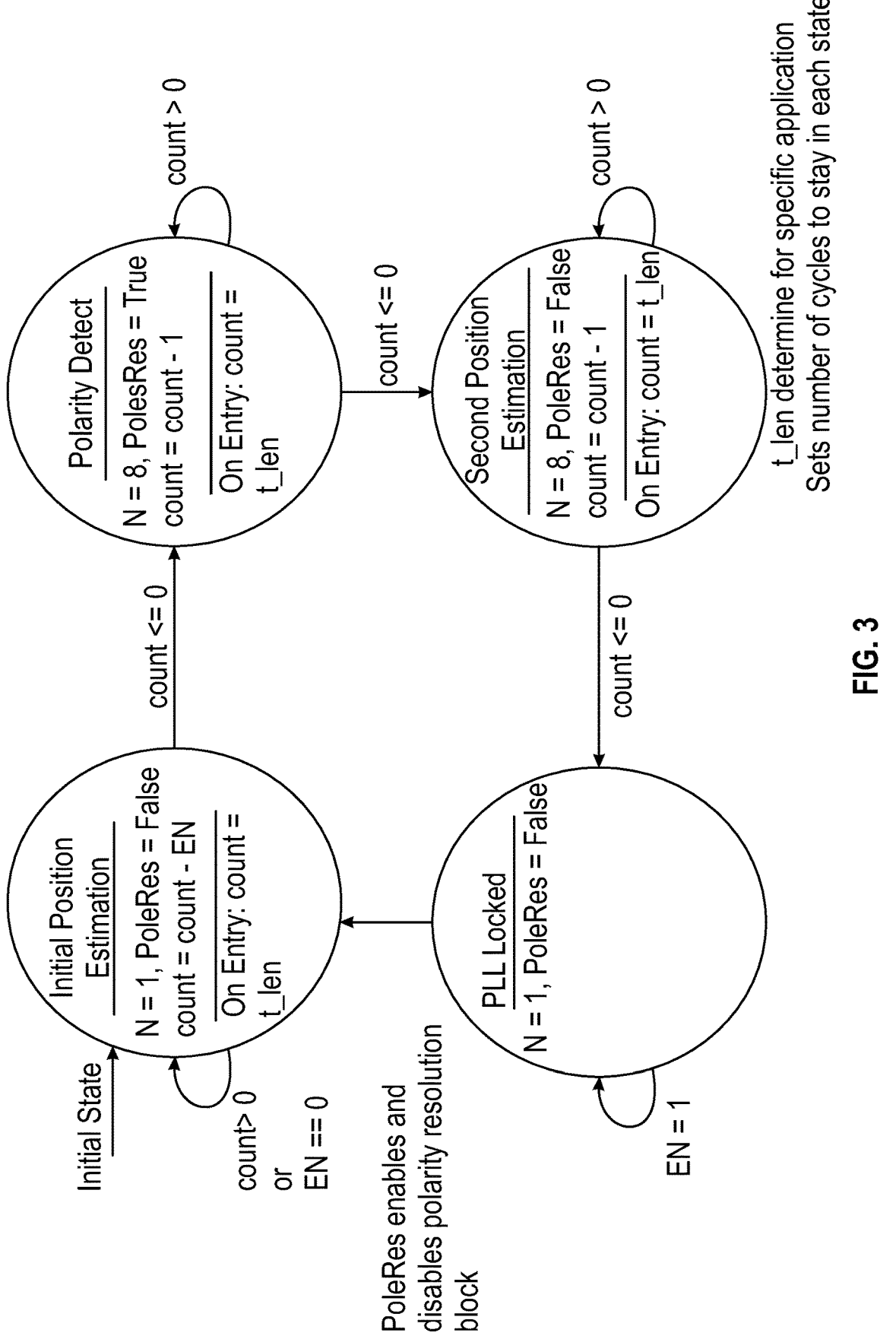
FIG. 3 representatively illustrates a state machine diagram of the saliency tracking observer of FIG. 2.

FIG. 3 is a state machine diagram of the saliency tracking observer of FIG. 2. In this diagram, t_len is determined for specific implementations, PoleRes=0 disables the polarity resolution block, and PoleRes=1 enables the polarity resolution block.

With reference to FIGS. 2 and 3, the saliency tracking observer functions as follows. A state machine injects a pulsating voltage in the estimated direct axis at a submultiple of the pulse width modulation (PWM) frequency, such as $\frac{1}{16}$ or lower frequency. For the moment, all torque producing current is disabled. The resulting currents are measured and transformed back into the estimated DQ frame. The currents are then fed through an envelope detector and low-pass filter. The low-pass filter cutoff is such that it rejects the selected injection frequency.

The resulting Q axis value is divided by the resulting D axis value. This value is fed into a PI type Phase Locked Loop (PLL). The PLL provides the position and speed estimate of the rotor. The D axis value is also fed through a bandpass filter (with a center frequency at twice the injection frequency) and modulated by twice the injection frequency. This value is then low-pass filtered to reject the injection frequency and all harmonics. The sign of this value determines whether to insert a 180° correction factor into the position estimate. For example, insert if positive, do not insert if negative.

After a brief period of time (e.g., 5× longest filter settling time), the state machine increases the injection frequency to be half the PWM frequency. Torque producing current is enabled, and the correction factor is frozen. Inductance can be calculated by dividing the injection voltage by the processed D axis current value and computing reactance. To obtain more accurate measurements, it may be beneficial to low pass filter the measured values and also use a number of different injection voltages to obtain a differential measurement.

Flux linkage can be calculated by dividing Q axis voltage by the speed estimate. In an exemplary aspect, this refers to the Q axis voltage from the PI current controller of the FOC system as depicted in FIG. 1. The voltage measurement must also compensate for resistive voltage drop if Q axis current is present. Again, use of a low pass filter may be desired to obtain accurate measurements.

1. Injection Voltage Generator

The voltage generator is defined as follows: Let Un (t) be the injection voltage waveform $$U_h = U_{hm} * \cos\left(\frac{f}{N} * \pi * t\right)$$

Equation 1 where $U_{hm}$ is the magnitude of the injection voltage, f is the control loop frequency, $N$ is the frequency divider, and t is time in seconds.

Note that the injection voltage has frequency equal to $$\frac{f}{2 * N}$$

and angular frequency $$\omega_h = \frac{f}{N} * \pi.$$

The frequency divider can be supplied by a state machine or other source and can be varied dynamically. $N$ is only limited by the maximum allowable magnitude of the current response that can be determined by the equations below. The state machine that determines N is depicted in FIG. 3. $N$ must be at least 2 and works best as a power of 2.

The injection voltage $U_{hm}$ is determined by the following procedure. $U_{hm}$ can be calculated by the equation:

$$U_{hm} = (I_{Response} * (2 * \pi * f * L_d)) + \text{distortion}$$ Equation 2 where $I_{Response}$ is the desired magnitude of the injected current response. This can be determined by determining the required current to achieve a desired signal-to-noise ratio (SNR) with a given data acquisition stage. f is the frequency of the injection voltage, as determined by $N$, $L_d$ is the direct axis inductance. If direct axis inductance is unknown, any arbitrary voltage can be used instead so long as it overcomes any inverter nonlinearity and does not result in an overcurrent condition on the inverter. This can be done by selecting a minimum value of inductance to accommodate and selecting $I_{Response}$ based off this minimum inductance value. $V_{distortion}$ is the voltage distortion incurred from inverter nonlinearities such as dead-time distortion. Dead-time distortion comprises the bulk of inverter nonlinearity for this context, and can be calculated by taking a fraction of dead-time to PWM period and multiplying by the bus voltage Note that with sufficiently high frequency control loops, N can be chosen such that the injection frequency is beyond the audible range of human hearing, nominally stated to be 15 kilohertz (kHz).

2. Envelope Detectors and Low-Pass Filters

An envelope detector may be constructed in the following way: The envelope detector is implemented as a zero-order hold that samples every $N/2$ cycles and lags behind the voltage injection generator by $N/4$ cycles (taking floor if $N/4$ is not an integer). This is because the injection current response can be modelled by the following equation:

$$I_{inj} = K * \sin\left(\frac{f}{N} * \pi * t\right)$$

Equation 3 where K is injection voltage divided by the line-to-neutral direct axis impedance of the three-phase motor.

An exemplary envelope detector may be implemented by the following pseudo-code:

```
if ((cycle_count − floor(N/4)) % (N/2) == 0)
{
    amplitude = sampled_current * (floor((cycle_count%N)/(N/2)) == 1 ?
    −1: 1);
}
else
{
amplitude = 0;
}
cycle_count++;
return amplitude;
```

The code executes every iteration of the control loop.

An exemplary low-pass filter may comprise a two-pole infinite impulse response filter tuned for a cut-off frequency of 25/170 times the Nyquist frequency. This filter has a settling time of about 10 time-steps. The coefficients are as follows:

Recursive coefficients: −0.2722149379, 0.7477891783

Finite coefficients: 1, 2, 1

Gain: 7.7873275

The coefficients are ordered oldest sample to newest sample from left to right.

The filter achieves unity gain by first accumulating the result of the finite stage of the filter and dividing that result by the gain before accumulating the recursive stage.

Other coefficients or different filter order can be used to achieve a different frequency response as required by the application. For example, a lower cutoff frequency can be selected at the expense of settling time.

3. Error Calculation and Phase-Locked Loop Construction

The error to be corrected for in a PLL is computed as follows.

Figure 4:
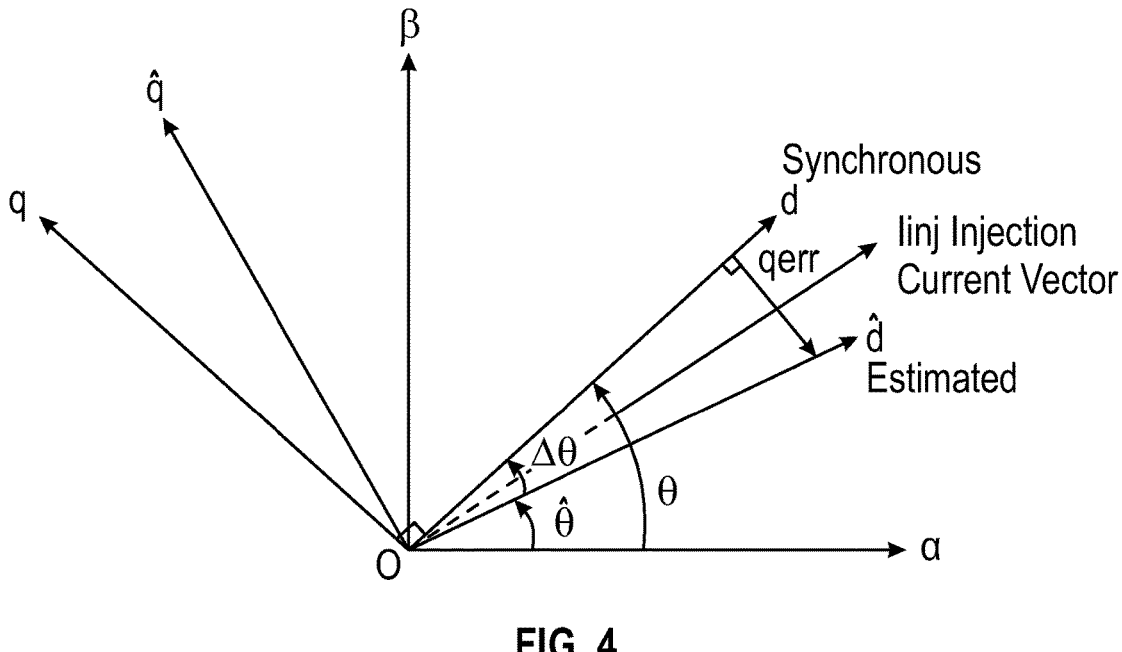
FIG. 4 representatively illustrates a graphical diagram of stationary, estimated synchronous, and true synchronous frames for injection currents.

FIG. 4 is a graphical diagram of stationary, estimated synchronous, and true synchronous frames for injection currents. Voltage is injected in the vector direction d̂. As a result of the scenario depicted in FIG. 4, the injection currents are of the form: where $$\hat{i}_{dh} = (I_{ave} + I_{dif}\cos(2\Delta\theta))\sin(\omega_h t) \qquad \text{Equation 4}$$

$$\hat{i}_{qh} = I_{dif}\sin(2\Delta\theta)\sin(\omega_h t) \qquad \text{Equation 5}$$

$$I_{ave} = \frac{U_{hm}(L_q + L_d)}{2\omega_h L_d L_q} \qquad \text{Equation 6}$$

$$I_{dif} = \frac{U_{hm}(L_q - L_d)}{2\omega_h L_d L_q} \qquad \text{Equation 7}$$

These follow from the park transformation of the currents resulting from a voltage injection occurring in the vector direction d̂. $\Delta\Theta=/=0$ results in a $q_{err}$ term as shown which experiences a different impedance, namely $L_q$ instead of $L_d$, to the component in the vector direction d̂. This results in a rotation in the resulting current vector, $I_{inj}$, relative to the injected voltage vector, producing the equations described above. $\hat{i}_{dh}$ is the component of $I_{inj}$ in the vector direction d̂, while $\hat{i}_{qh}$ is the component of $I_{inj}$ in the vector direction q̂.

Following the previously discussed envelope detector and low-pass filter results in:

$$\hat{i}_{dhm} = I_{ave} + I_{dif}\cos(2\Delta\Theta) \qquad \text{Equation 8}$$

$$\hat{i}_{qhm} = I_{dif}\sin(2\Delta\Theta) \qquad \text{Equation 9}$$

assuming $\Delta\Theta\approx0$ but nonzero when $x\approx0$, $\sin(x)\approx x$, $\cos(x)\approx1$.

Dividing the quadrature axis result by the direct axis results yields $$\frac{\hat{i}_{qhm}}{\hat{i}_{dhm}} = \Delta\Theta\left(1 - \frac{L_d}{L_q}\right) \qquad \text{Equation 10}$$

where $$\frac{L_d}{L_q}$$

is the reciprocal of the saliency ratio. The saliency ratio, if known, can be compensated for at this stage; otherwise, the ratio can be accommodated by the transient characteristics of the PLL. Thus, the error term can be formulated from Equation 10 as $$\text{Error} = \frac{\hat{i}_{qhm}}{\hat{i}_{dhm}}.$$

When $\Delta\Theta>>0$, the error term becomes less well defined. It is necessary to limit the error term within reasonable bounds. This can be accomplished by taking the arctangent of the error value as arctangent asymptotically approaches positive or negative $\pi/2$ for large x. Since arctan $x\approx x$ when $x\approx0$, this can be done for all error computations. Thus, an alternate formulation for the error term from Equation 10 can be $$\text{Error} = \arctan_2\left(\frac{\hat{i}_{qhm}}{\hat{i}_{dhm}}\right),$$

where $\arctan_2$ is a four-quadrant arctangent.

The PLL is constructed as a PI-type PLL, where the error signal is multiplied by a proportional gain to obtain position, and the error signal is integrated and multiplied by an integral gain to obtain speed. The estimated speed is also used in the position estimation.

From the transfer function of such PI-type PLLs, $K_p=2\omega$ and $K_i=\omega^2$, where $\omega$ is the bandwidth of the PLL (i.e., settling time and frequency response). If saliency ratio is not compensated for, then it becomes incorporated into the coefficients of the PLL as such $$\left(1 - \frac{L_d}{L_q}\right)K_p = 2\omega \text{ and } \left(1 - \frac{L_d}{L_q}\right)K_i = \omega^2.$$

As a result, a selected range of saliency ratios can be identified such that $K_p$ and $K_i$ result in an overdamped system with bandwidth above a desired threshold. While the dynamic response will be degraded compared to a critically damped system, the result is that PLL will always be stable so long as the motor saliency remains above a threshold as determined by the chosen $K_p$ and $K_i$. In an example implementation, $K_p$ was chosen as 16,000 and $K_i$ chosen as 2,000,000. This resulted in a system that remains sufficiently damped, and thus stable, down to a saliency ratio of 10%.

Rotor position and speed can be directly estimated by the outputs of this PLL. In order to allow for dynamic frequency scaling, the PLL is only updated when the peaks of the signal are detected.

Below is pseudo code that demonstrate an exemplary implementation of such error correction and PLL. envelope( ) is a function that returns the value of the signal at the peak, and zero elsewhere. low_pass_filt( ) is a function that runs an infinite impulse response low pass filter of the signal.

```
—  {
    park_transform(Ialpha, Ibeta, &Id, &Iq, Position);
    Iqh = envelope(Iq);
    Idh = envelope(Id);
    if(Idh != 0)
    {
        Idhm = low_pas_filt(Idh);
        Iqhm = low_pass_filt(Iqh);
        Error = Iqhm / Idhm;
        Position = (Error * Kp * timestep) + (Speed * timestep);
        Speed = Error * Ki * timestep;
    }
}
```

4. Polarity Resolution

One issue with the formation of the error term is that the PLL has stable points at $\Delta\Theta=0°$ and $\Delta\Theta=180°$. As such, there is a need to identify magnet polarity.

Figure 5:
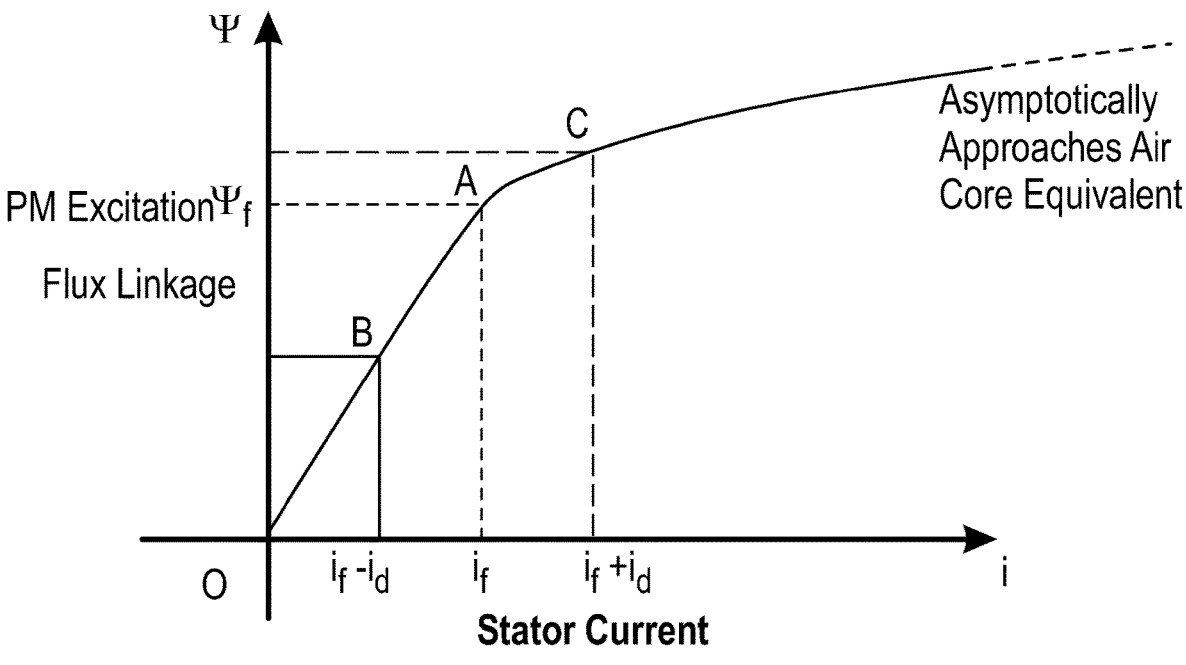
FIG. 5 representatively illustrates a graphical representation of flux linkage as a function of stator current.

FIG. 5 is a graphical representation of flux linkage as a function of stator current. The direct axis flux linkage starts at $\varphi_f$ while the quadrature axis flux linkage starts at 0. $I_f$ represents the equivalent excitation current required to produce the permanent magnet flux linkage in the direct axis. The slope of the line in FIG. 5 represents stator inductance at the given current.

As can be seen from the graph, as the flux linkage increases due to stator current, the direct axis inductance decreases significantly while the quadrature axis inductance varies only slightly. Since a pulsating voltage causes a positive and negative direct axis current, this results in harmonics in the resulting direct axis current waveform.

Figure 6A:
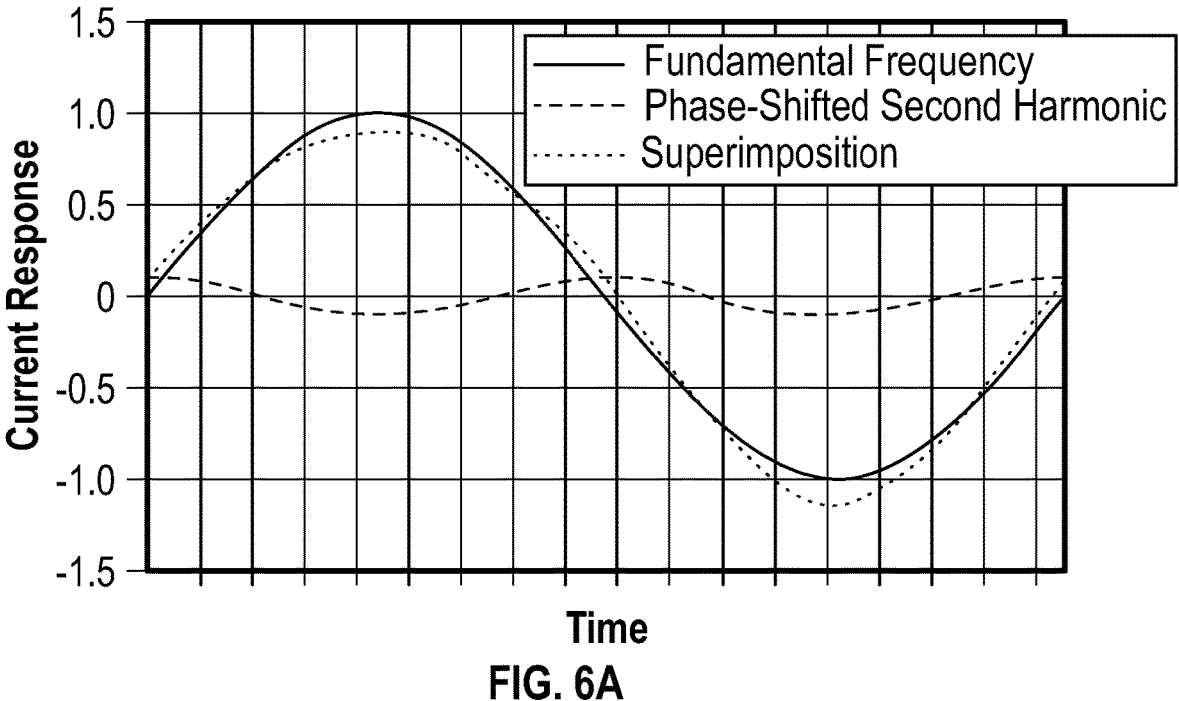
FIG. 6A representatively illustrates a graphical representation of inductance variation with positive and negative current resulting in modulation of harmonics in the current response, where $\Delta\Theta=180°$.

FIG. 6A is a graphical representation of inductance variation with positive and negative current resulting in modulation of harmonics in the current response, where $\Delta\Theta=180°$. When the polarity is inverted, a positive estimated direct axis voltage results in a negative real direct axis current, which results in an increase in inductance and decrease in amplitude.

Figure 6B:
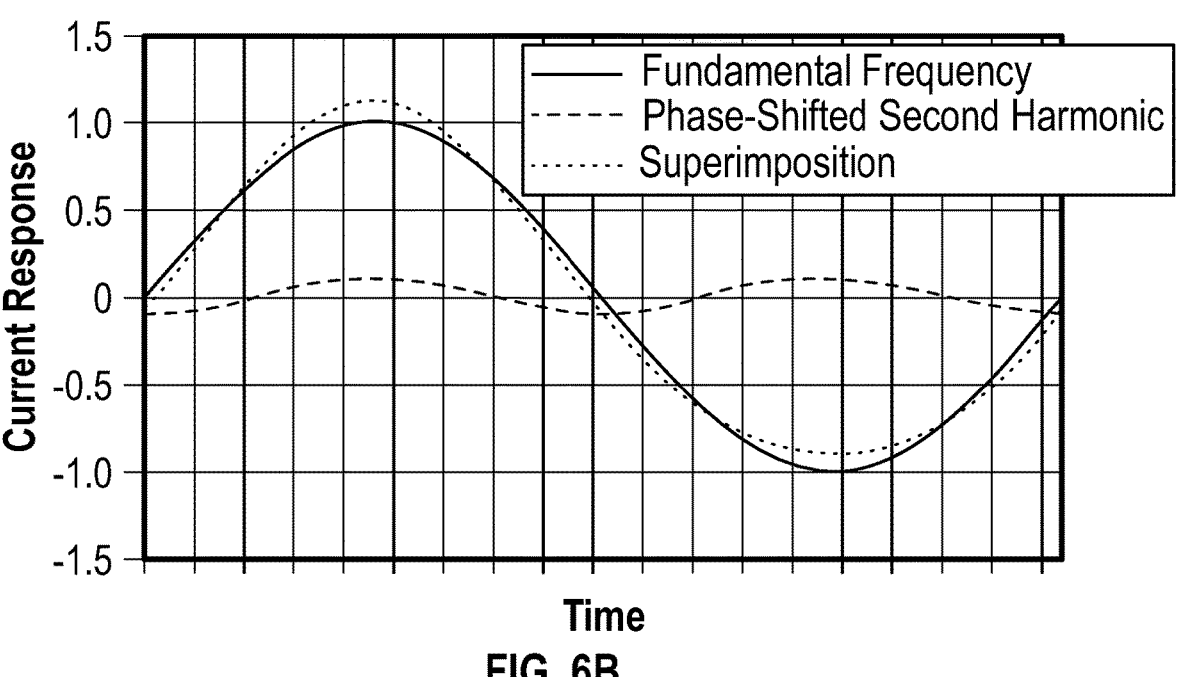
FIG. 6B representatively illustrates a graphical representation of inductance variation with positive and negative current resulting in modulation of harmonics in the current response, where $\Delta\Theta=0°$.

FIG. 6B is a graphical representation of inductance variation with positive and negative current resulting in modulation of harmonics in the current response, where $\Delta\Theta=0°$. When the polarity is correct, a positive estimated direct axis voltage results in a positive real direct axis current, which results in a decrease in inductance and increase in amplitude.

The difference between the two is the relative phase of the second harmonic with the fundamental.

The second harmonic can be isolated by an infinite impulse response bandpass filter whose center frequency is $2*(2*\pi*\omega_h)$, where $2*\pi*\omega_h$ is the injection frequency. Since the Nyquist is f/2 where f is the control loop frequency, a lower frequency must be used to resolve the magnet polarity. Frequency divider of $N=16$ or larger is recommended.

The corner frequencies of the bandpass filter need not be precise but must sufficiently isolate the harmonic signal in question. Exact coefficients will depend on the end application as aggressive corner frequencies will result in excessive round-off error.

This bandpass filtered signal is then modulated with $$f(t) = \cos\left(2*\frac{f}{N}*\pi*t\right)$$

and subsequently low pass filtered. The low pass filter should be an infinite impulse response with coefficients chosen with a very low cut-off frequency, near DC, but sufficiently high enough to prevent excessive round-off error. Exact coefficients will depend on application.

In FIG. 6A, the phase shifted second harmonic has equation $$p_1(t) = \cos\left(2*\frac{f}{N}*\pi*t\right).$$

while in FIG. 6B the equation is $$p_2(t) = -\cos\left(2*\frac{f}{N}*\pi*t\right).$$

Thus, $f(t)*p_1(t)$ will always be positive while $f(t)*p_2(t)$ will always be negative. Subsequent low pass filtering of these values will result in a value that is always positive or always negative.

Call the result of the signal p(t) and if $\Delta\Theta=0$, then $p(t)<0$, and when $\Delta\Theta=180°$, then $p(t)>0$. The polarity resolution only needs to be done once. Once the polarity has been identified, a compensation factor can be inserted into the position estimate and the frequency divider can be reduced. This is represented by @comp in FIG. 2. Once polarity resolution has completed, the computations are no longer necessary and can be bypassed by state machine instruction as depicted in FIGS. 2 and 3.

C. Observer Decoupler

Figure 7:
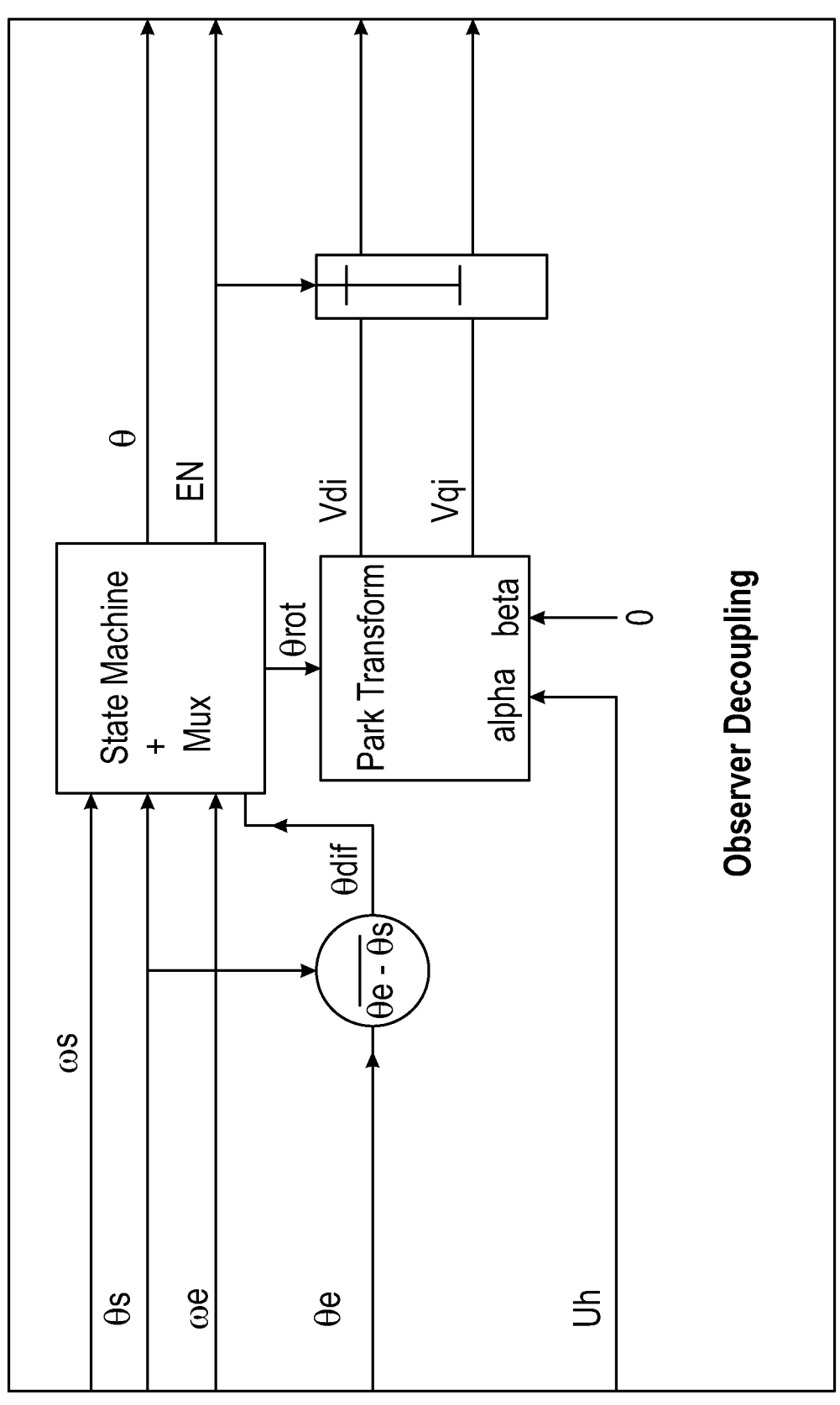
FIG. 7 representatively illustrates a schematic block diagram of an exemplary observer decoupler such as illustrated in FIG. 1.

FIG. 7 is a schematic block diagram of an exemplary observer decoupler such as illustrated in FIG. 1. The observer decoupler includes the following components:

Position Multiplexor; and

Voltage Mixer.

The purpose of the observer decoupling block is to decouple the saliency tracking observer from the rest of the FOC algorithm. Saliency tracking requires that the voltage be injected in the estimated direct axis for the saliency tracking observer. This presents a problem when other observers, such as a BEMF based observer, estimate a different rotor angle. The observer decoupling block decides which position estimate to use for the PI current controllers and, if necessary, rotates the injection voltage so that the voltage is injected in the estimated direct axis of the saliency tracking observer even if the saliency tracking observer's estimate is not used.

The observer decoupler selects the position estimate to use and distributes that position to the rest of the FOC algorithm as shown in FIG. 1.

Figure 8:
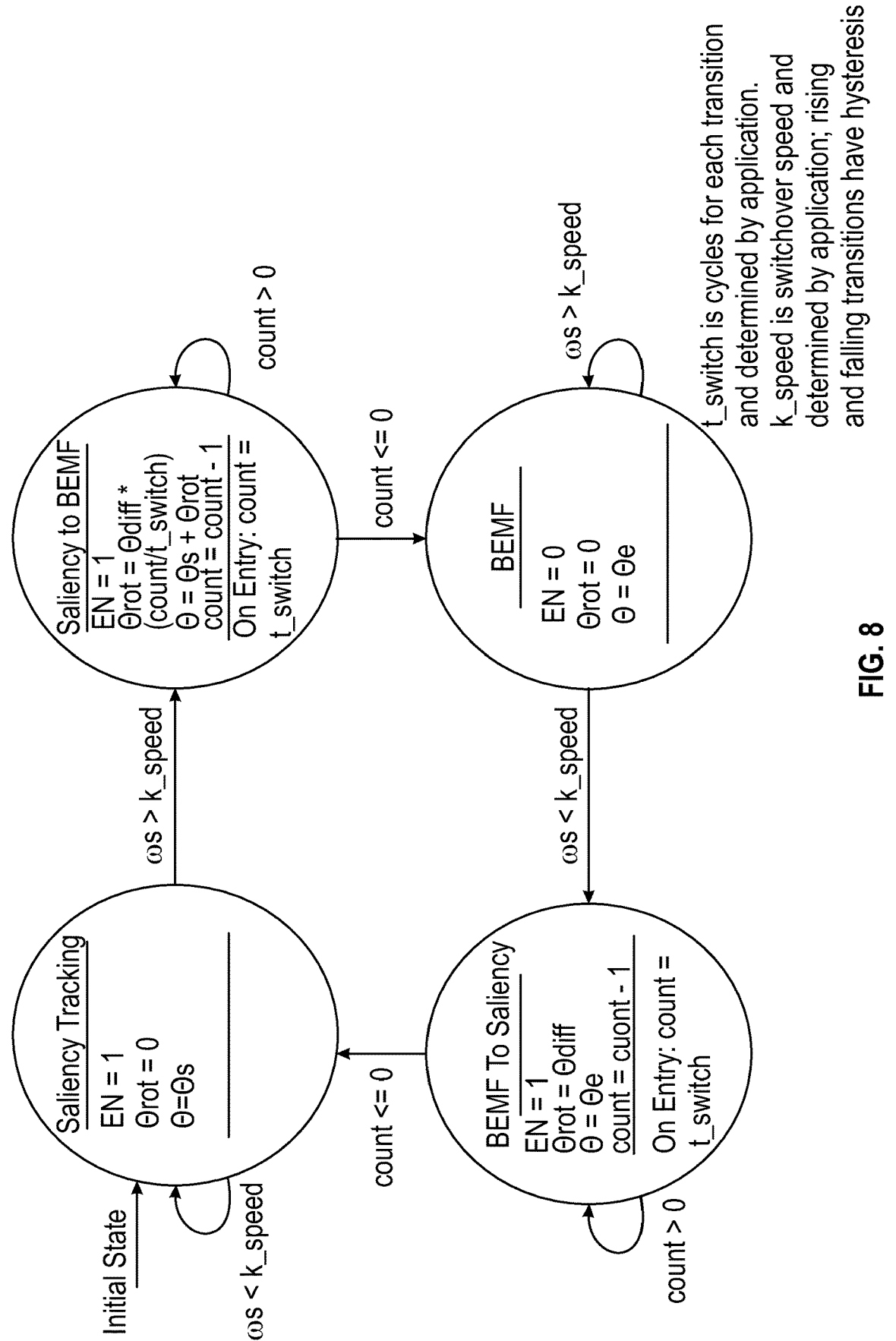
FIG. 8 representatively illustrates a state machine diagram of the saliency tracking observer of FIG. 7.

FIG. 8 is a state machine diagram of the saliency tracking observer of FIG. 7. In this diagram, t_switch is implementation specific, k_speed is in radians per second and can be selected based on application, and transitions have hysteresis on k_speed.

1. Position Multiplexor

The position multiplexor selects the position estimate to use based on the output of the state machine shown in FIG. 8. The behavior can be summarized as follows.

The speed estimate from the currently selected position observer is used for state transition decisions. If the speed falls below a certain threshold, the saliency tracking observer is activated, and its position estimate is used. If the speed exceeds a certain threshold, the saliency tracking observer is disabled and the BEMF observer's estimate is used. When switching between position estimates, an intermediary period is inserted where a weighted average of both estimates is used. The weight of each estimate depends on time elapsed, with the weight of newly selected estimate increasing with time.

2. Voltage Mixer

When the saliency tracking observer is activated, but the selected position estimate is not equal to the saliency tracking observer's position estimate, the voltage mixer computes the necessary synchronous voltages so that the requested voltage is injected at the correct angle.

As seen in FIG. 7, one of the outputs of the position multiplexor is the difference between the saliency tracking estimate and the output position estimate, $\Theta_{rot}$. This angle is used in the park transform to rotate the requested injection voltage into the frame of the output position estimate. This rotated voltage is fed to the voltage injection taps in the inverter output voltage signals as shown in FIG. 1. The result is that even though the saliency tracking observer's estimate is not used, the requested injection voltage is still injected in the frame of the saliency tracker. Thus, this allows for the saliency tracking observer to be completely decoupled from the rest of the FOC system, allowing for multiple independent observers to be operated simultaneously.

D. Saliency Amplifier

The purpose of the saliency amplification block is to amplify the saliency signal to enhance stability. The saliency amplification block includes a direct axis current injector. The direct axis current injector simply requests additional direct axis current, which is typical in applications that require flux linkage modulation. Flux linkage modulation is only possible on motors with significant rotor inductance, so on BLDC motors, this effect is minimal as they usually do not feature significant amounts of rotor iron. In typical PMSM applications, the requested direct axis current is 0. With the saliency amplification block, the direct axis current is positive. Even on PMSM with reluctance saliency, the increase in flux linkage is beneficial, so long as the BEMF observer can accommodate variable flux linkage.

FIG. 5 illustrates how small additions of direct axis current can have very large impacts on the direct axis inductance. The direct axis current injector simply requests additional direct axis current when the saliency tracking observer is in the "closed loop control" state as shown in FIG. 3. The amount of direct axis current is proportional to the requested quadrature (torque generating) current and saturates at a fraction of the maximum allowable quadrature axis current. Call this maximum direct axis injection $I_{d\_inj\_max}$ and call the maximum allowable quadrature axis current $I_{q\_max}$. The exact proportions and saturation limits will depend on the specific application.

The motivation for this additional current injection is that as quadrature axis current approaches $I_{q\_max}$, saturation saliency begins to disappear as the quadrature axis is now saturating to a similar degree as the direct axis. By injecting this additional current, the direct axis inductance now decreases as quadrature axis inductance decreases, preserving saliency. Care must be taken such that $I_{q\_max}$ does not exceed $I_f + I_{d\_inj\_max}$ while in saliency tracking operation.

This block is not compatible with other reluctance-based torque producing algorithms such as field weakening and maximum torque per ampere (MTPA), and such algorithms must be disabled while in saliency tracking operation.

III. Method for Estimating Rotor Position of a PMSM

Figure 9:
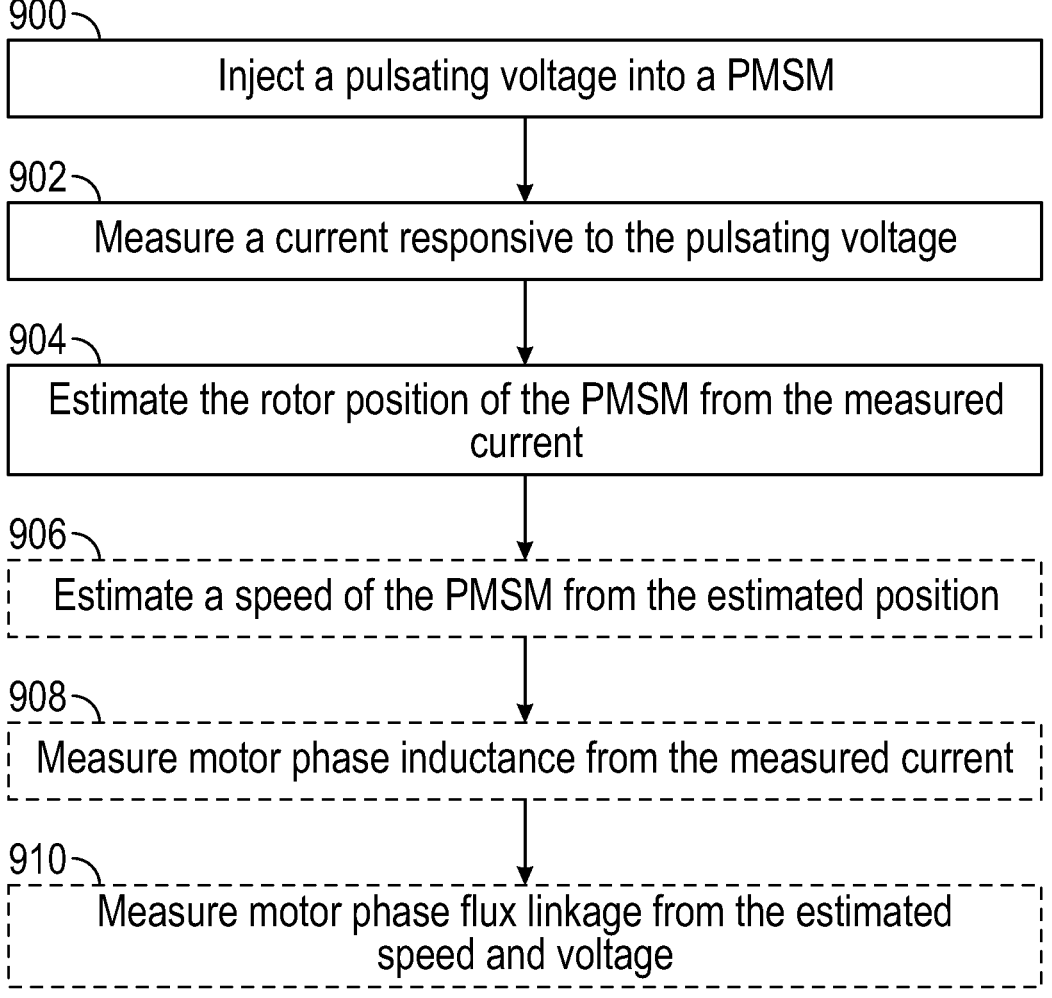
FIG. 9 representatively illustrates a flow diagram illustrating a process for estimating rotor position of a PMSM.

FIG. 9 is a flow diagram illustrating a process for estimating rotor position of a PMSM. Dashed boxes represent optional steps. The process begins at operation 900, with injecting a pulsating voltage into the PMSM. In an exemplary aspect, injecting the pulsating voltage into the PMSM comprises injecting the pulsating voltage in an estimated direct axis of the PMSM at a submultiple of a PWM frequency of the PMSM. The process continues at operation 902, with measuring a current responsive to the pulsating voltage. In an exemplary aspect, measuring the current responsive to the pulsating voltage comprises calculating an error of the measured current using a PLL, and may further include identifying (and compensating for) a polarity of the error calculated using the PLL.

The process continues at operation 904, with estimating the rotor position of the PMSM from the measured current. The process may optionally continue at operation 906, with measuring speed of the PMSM from the measured current. The process may optionally continue at operation 908, with measuring motor phase inductance from the measured current. The process may optionally continue at operation 910, with measuring motor phase flux linkage from the measured current.

Although the operations of FIG. 9 are illustrated in a series, this is for illustrative purposes and the operations are not necessarily order dependent. Some operations may be performed in a different order than that presented. Further, processes within the scope of this disclosure may include fewer or more steps than those illustrated in FIG. 9.

IV. Computer System

Figure 10:
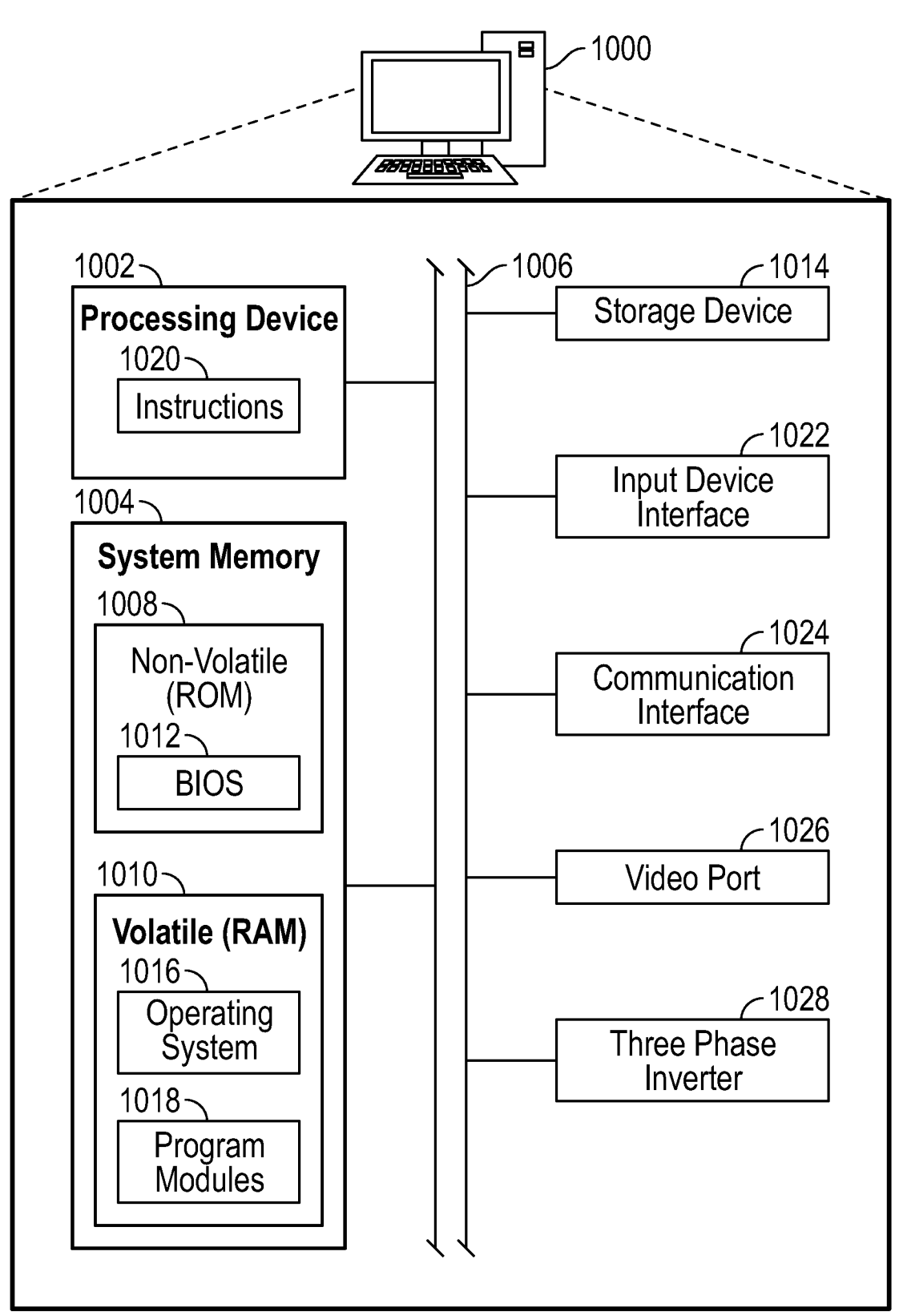
FIG. 10 representatively illustrates a block diagram of a computer system suitable for implementing improved saliency tracking according to embodiments disclosed herein.

FIG. 10 is a block diagram of a computer system 1000 suitable for implementing improved saliency tracking according to embodiments disclosed herein. The computer system 1000 comprises any computing or electronic device capable of including firmware, hardware, and/or executing software instructions that could be used to perform any of the methods or functions described above, such as estimating rotor position of a PMSM. In this regard, the computer system 1000 may be a circuit or circuits included in an electronic board card, such as a printed circuit board (PCB), a server, a personal computer, a desktop computer, a laptop computer, an array of computers, a personal digital assistant (PDA), a computing pad, a mobile device, or any other device, and may represent, for example, a server or a user's computer. The exemplary computer system 1000 in this embodiment includes a processing device 1002 or processor, a system memory 1004, and a system bus 1006. The system memory 1004 may include non-volatile memory 1008 and volatile memory 1010. The non-volatile memory 1008 may include read-only memory (ROM), erasable programmable read-only memory (EPROM), electrically erasable programmable read-only memory (EEPROM), and the like. The volatile memory 1010 generally includes random-access memory (RAM) (e.g., dynamic random-access memory (DRAM), such as synchronous DRAM (SDRAM)). A basic input/output system (BIOS) 1012 may be stored in the non-volatile memory 1008 and can include the basic routines that help to transfer information between elements within the computer system 1000.

A general purpose three-phase inverter and its associated interface are thus connected to the system bus 1006. The three-phase inverter provides various hardware that facilitates various devices including, but not limited to, the measuring of currents and voltages flowing through the motor, and the application of Pulse Width Modulation (PWM) of the three-phase voltages. The inverter can communicate to the processing device 1002 through the system bus, and can transmit and receive signals including, but not limited to, PWM signals, current measurements, and voltage measurements. This inverter facilitates the application of the embodiments herein for BLDC and PMSM motors.

The system bus 1006 provides an interface for system components including, but not limited to, the system memory 1004 and the processing device 1002. The system bus 1006 may be any of several types of bus structures that may further interconnect to a memory bus (with or without a memory controller), a peripheral bus, and/or a local bus using any of a variety of commercially available bus architectures.

The processing device 1002 represents one or more commercially available or proprietary general-purpose processing devices, such as a microprocessor, central processing unit (CPU), or the like. More particularly, the processing device 1002 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 1002 is configured to execute processing logic instructions for performing the operations and steps discussed herein.

In this regard, the various illustrative logical blocks, modules, and circuits described in connection with the embodiments disclosed herein may be implemented or performed with the processing device 1002, which may be a microprocessor, field programmable gate array (FPGA), a digital signal processor (DSP), an application-specific integrated circuit (ASIC), or other programmable logic device, a discrete gate or transistor logic, discrete hardware components, or any combination thereof designed to perform the functions described herein. Furthermore, the processing device 1002 may be a microprocessor, or may be any conventional processor, controller, microcontroller, or state machine. The processing device 1002 may also be implemented as a combination of computing devices (e.g., a combination of a DSP and a microprocessor, a plurality of microprocessors, one or more microprocessors in conjunction with a DSP core, or any other such configuration).

The computer system 1000 may further include or be coupled to a non-transitory computer-readable storage medium, such as a storage device 1014, which may represent an internal or external hard disk drive (HDD), flash memory, or the like. The storage device 1014 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as optical disks, magnetic cassettes, flash memory cards, cartridges, and the like, may also be used in the operating environment, and, further, that any such media may contain computer-executable instructions for performing novel methods of the disclosed embodiments.

An operating system 1016 and any number of program modules 1018 or other applications can be stored in the volatile memory 1010, wherein the program modules 1018 represent a wide array of computer-executable instructions corresponding to programs, applications, functions, and the like that may implement the functionality described herein in whole or in part, such as through instructions 1020 on the processing device 1002. The program modules 1018 may also reside on the storage mechanism provided by the storage device 1014. As such, all or a portion of the functionality described herein may be implemented as a computer program product stored on a transitory or non-transitory computer-usable or computer-readable storage medium, such as the storage device 1014, volatile memory 1010, non-volatile memory 1008, instructions 1020, and the like. The computer program product includes complex programming instructions, such as complex computer-readable program code, to cause the processing device 1002 to carry out the steps necessary to implement the functions described herein.

An operator, such as the user, may also be able to enter one or more configuration commands to the computer system 1000 through a keyboard, a pointing device such as a mouse, or a touch-sensitive surface, such as the display device, via an input device interface 1022 or remotely through a web interface, terminal program, or the like via a communication interface 1024. The communication interface 1024 may be wired or wireless and facilitate communications with any number of devices via a communications network in a direct or indirect fashion. An output device, such as a display device, can be coupled to the system bus 1006 and driven by a video port 1026. Additional inputs and outputs to the computer system 1000 may be provided through the system bus 1006 as appropriate to implement embodiments described herein.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

Those skilled in the art will recognize improvements and modifications to the preferred embodiments of the present disclosure. All such improvements and modifications are considered within the scope of the concepts disclosed herein and the claims that follow.

What is claimed is:

1. A method for estimating rotor position of a synchronous machine, the method comprising:
   (a) injecting a voltage into the synchronous machine;
   (b) measuring a current responsive to the voltage injected at (a); and
   (c) estimating the rotor position of the synchronous machine based at least in part on the current measured at (b).

2. The method of claim 1, further comprising measuring motor phase inductance based at least in part on the current.

3. The method of claim 1, further comprising measuring motor phase flux linkage based at least in part on the current.

4. The method of claim 1, wherein injecting the voltage into the synchronous machine comprises injecting the voltage in an estimated direct axis of the synchronous machine.

5. The method of claim 4, wherein measuring the current responsive to the voltage comprises calculating an error of the current using a phase-locked loop (PLL).

6. The method of claim 5, further comprising identifying a polarity of the error calculated using the PLL.

7. The method of claim 4, wherein injecting the voltage in the estimated direct axis of the synchronous machine comprises injecting the voltage in the estimated direct axis of the synchronous machine at a submultiple of a pulse-width modulation (PWM) frequency of the synchronous machine.

8. The method of claim 1, further comprising:
   (d) implementing field oriented control (FOC) of the synchronous machine based at least in part on the rotor position estimated in (d).

9. The method of claim 1, wherein the voltage injected into the synchronous machine at (a) comprises a pulsating voltage.

10. The method of claim 1, wherein the synchronous machine is a permanent magnet synchronous motor (PMSM).

11. A rotor position estimator for a synchronous machine, comprising:
   a voltage generator configured to inject a voltage into the synchronous machine;
   a detector configured to measure a current responsive to the voltage injected by the voltage generator; and
   a phase-locked loop (PLL) configured to estimate a rotor position of the synchronous machine based at least in part on the current measured by the detector.

12. The rotor position estimator of claim 11, wherein the voltage generator comprises a hybrid frequency voltage generator.

13. The rotor position estimator of claim 11, wherein the detector comprises a low-pass filter configured to reject a frequency of the injected voltage from the current.

14. The rotor position estimator of claim 11, wherein the PLL is further configured to estimate a speed of the synchronous machine based at least in part on the current measured by the detector.

15. The rotor position estimator of claim 11, wherein the PLL comprises a bandpass filter with a center frequency at twice a frequency of the injected voltage.

16. The rotor position estimator of claim 15, wherein the PLL further comprises a low-pass filter configured to reject the frequency of the injected voltage and harmonics thereof.

17. The rotor position estimator of claim 11, further comprising a polarity resolution block to identify a polarity of an error calculation of the PLL.

18. The rotor position estimator of claim 11, further comprising:

a controller configured to implement field oriented control (FOC) of the synchronous machine based at least in part on the rotor position estimated by the PLL.

19. The rotor position estimator of claim 11, wherein the voltage generator is configured to inject the voltage into the synchronous machine as a pulsating voltage.

20. The rotor position estimator of claim 11, wherein the voltage generator is configured to inject the voltage into an estimated direct axis of the synchronous machine.

21. The rotor position estimator of claim 20, wherein the voltage generator is configured to inject the voltage in the estimated direct axis of the synchronous machine at a submultiple of a pulse-width modulation (PWM) frequency of the synchronous machine.

22. The rotor position estimator of claim 11, wherein the synchronous machine is a permanent magnet synchronous motor (PMSM).

\* \* \* \* \*